US011915129B2

(12) United States Patent
Shraga et al.

(10) Patent No.: US 11,915,129 B2
(45) Date of Patent: Feb. 27, 2024

(54) METHOD AND SYSTEM FOR TABLE RETRIEVAL USING MULTIMODAL DEEP CO-LEARNING WITH HELPER QUERY-DEPENDENT AND QUERY-INDEPENDENT RELEVANCE LABELS

(71) Applicant: International Business Machines Corporation, Armonk, NY (US)

(72) Inventors: Roee Shraga, Haifa (IL); Haggai Roitman, Yoknea'm Elit (IL); Guy Feigenblat, Givataym (IL); Mustafa Canim, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 16/861,248

(22) Filed: Apr. 29, 2020

(65) Prior Publication Data

US 2021/0342684 A1   Nov. 4, 2021

(51) Int. Cl.
*G06N 3/08*       (2023.01)
*G06N 3/04*       (2023.01)
*G06F 16/2457*    (2019.01)
*G06F 16/22*      (2019.01)
*G06F 16/242*     (2019.01)

(52) U.S. Cl.
CPC .......... *G06N 3/08* (2013.01); *G06F 16/2282* (2019.01); *G06F 16/243* (2019.01); *G06F 16/24578* (2019.01); *G06N 3/04* (2013.01)

(58) Field of Classification Search
CPC .......... G06N 3/08; G06N 3/04; G06F 16/243; G06F 16/2282; G06F 16/24578
See application file for complete search history.

(56) References Cited

U.S. PATENT DOCUMENTS

| 2007/0094285 | A1* | 4/2007 | Agichtein | G06F 16/2428 |
| | | | | 707/999.101 |
| 2016/0071024 | A1 | 3/2016 | Amer | |
| 2019/0333400 | A1 | 10/2019 | Saini | |

OTHER PUBLICATIONS

Arevalo et al. "Gated Multimodal Units for Information Fusion" arXiv:1702.01992, 2017.*
Logan et al. "Multimodal attribute extraction." arXiv preprint arXiv:1711.11118 (Year: 2017).*
Trabelsi et al, "Improved Table Retrieval Using Multiple Context Embeddings for Attributes," 2019 IEEE International Conference on Big Data (Big Data), Los Angeles, CA, USA, pp. 1238-1244, doi: 10.1109/BigData47090.2019.9005681, (Year: 2019).*

* cited by examiner

*Primary Examiner* — Kannan Shanmugasundaram
(74) *Attorney, Agent, or Firm* — G.E. Ehrlich Ltd.

(57) ABSTRACT

A system and a computer-implemented method for ranking tabular data entities by likelihood of comprising answers for (natural language) queries, based on multimodal descriptions of the tabular data entities, comprising separate representations, which represent different aspects of the tabular data entities. The ranking is based on joint representations, generated from the query representation and separate representations of the tabular data entities' aspects, using gated multimodal units. The computer-implemented method may be used for applications such as web searches, data aggregation, and research tasks.

20 Claims, 8 Drawing Sheets

(a) WikiTables

| Method | P@5 | P@10 | N@5 | N@10 | N@20 | MAP |
|---|---|---|---|---|---|---|
| single-field | 47.33 | 42.17 | 47.81 | 49.27 | 55.22 | 39.86 |
| multi-field | 54.00 | 46.50 | 54.13 | 55.92 | 61.15 | 44.77 |
| NRM-F | 52.28 | 45.79 | 54.17 | 58.82 | 64.97 | 48.39 |
| LTR | 52.67 | 45.17 | 55.27 | 54.56 | 60.31 | 41.12 |
| STR | 58.33 | 53.67 | 59.51 | 62.93 | 68.25 | 51.41 |
| T2VW | 56.67 | 50.67 | 59.74 | 60.96 | 65.05 | 46.75 |
| T2VE | 55.00 | 47.00 | 56.02 | 55.69 | 61.61 | 41.76 |
| Anon. | 60.00 | 51.00 | 64.98 | 64.79 | 69.35 | 51.24 |
| $MTR_{point}$ | 70.76†* | 60.33* | 67.71* | 68.39 | 71.74 | 57.34 |
| $MTR_{pair}$ | 64.56†* | 56.49 | 66.31* | 68.13 | 73.70 | 60.58†* |

(b) GNQtables

| Method | P@5 | P@10 | N@5 | N@10 | N@20 | MAP |
|---|---|---|---|---|---|---|
| single-field | 8.29 | 4.49 | 32.34 | 34.93 | 36.70 | 30.91 |
| multi-field | 8.06 | 5.03 | 31.87 | 35.18 | 37.59 | 31.13 |
| NRM-F | 12.67 | 7.12 | 50.64 | 53.17 | 54.47 | 47.81 |
| Anon. | 12.65 | 7.47 | 50.56 | 54.31 | 56.45 | 48.52 |
| $MTR_{point}$ | 14.60* | 7.67 | 62.27†* | 63.49†* | 63.59†* | 59.20†* |
| $MTR_{pair}$ | 18.26†* | 9.90†* | 69.45†* | 71.98†* | 72.20†* | 63.28†* |

FIG. 10

Table 2: Co-Learning effect. A darker blue color indicates higher performance. 'N@k' abbriviates 'NDCG@k'.

(a) WikiTables

| Method | | P@5 | P@10 | N@5 | N@10 | N@20 | MAP |
|---|---|---|---|---|---|---|---|
| MTR | All | 64.56 | 56.49 | 66.31 | 68.13 | 73.70 | 60.58 |
| MTR | no priors | 52.63 | 45.26 | 52.48 | 56.59 | 62.22 | 44.96 |
| MTR | no q-unimodal | 49.47 | 44.74 | 47.18 | 50.81 | 57.86 | 47.98 |
| MTR | only multimodal | 55.44 | 47.54 | 45.04 | 46.09 | 52.90 | 40.57 |

(b) GNQtables

| Method | | P@5 | P@10 | N@5 | N@10 | N@20 | MAP |
|---|---|---|---|---|---|---|---|
| MTR | All | 18.26 | 9.90 | 69.45 | 71.98 | 72.20 | 63.28 |
| MTR | no priors | 14.20 | 9.16 | 49.62 | 56.37 | 58.37 | 45.99 |
| MTR | no q-unimodal | 16.85 | 9.61 | 62.99 | 66.90 | 67.93 | 57.89 |
| MTR | only multimodal | 12.26 | 7.48 | 46.61 | 50.99 | 53.43 | 44.21 |

FIG. 11

METHOD AND SYSTEM FOR TABLE RETRIEVAL USING MULTIMODAL DEEP CO-LEARNING WITH HELPER QUERY-DEPENDENT AND QUERY-INDEPENDENT RELEVANCE LABELS

FIELD OF THE DISCLOSURE

The present disclosure, in some embodiments thereof, relates to tabular data processing, and, more particularly, but not exclusively, ranking tables by likelihood of answering a natural language question.

BACKGROUND

There are several known neural network based representations for natural language phrases, such as ELMo, BERT, and XLNet, which improve over bag of words based such as Word2Vec. These representations consider the word sense based on context, and perform well on question answering datasets such as SQuAD. There are embedding methods for tables such as Table2Vec, which consider tabular different structure elements, however handle them similarly.

SUMMARY

Following is a non-exclusive list including some examples of embodiments of the invention. The invention also includes embodiments which include fewer than all the features in an example and embodiments using features from multiple examples, also if not expressly listed below.

According to a first aspect of some embodiments of the present invention, there is provided a system for ranking tabular data entities by likelihood of comprising answers for (natural language) queries, the system comprising:
at least one memory storing a machine learning based model and a code; and
a processor adapted to execute the code for:
receiving a query and a plurality of descriptions of tabular entities, each description comprising a plurality of separate representations, and each of the plurality of separate representations represents a tabular data aspect;
generating a joint representation by combining a plurality of combined representations from the plurality of separate representations, wherein the combining is executed by at least one gated multimodal unit; and
generating a ranking for at least one of the tabular entities descriptions by combining the query and the joint representation.

According to a second aspect of some embodiments of the present invention, there is provided a computer implemented method for ranking tabular data entities by likelihood of comprising answers for (natural language) queries, comprising:
receiving a query and a plurality of descriptions of tabular entities, each description comprising a plurality of separate representations, and each of the plurality of separate representations represents a tabular data aspect;
generating a joint representation by combining a plurality of combined representations from the plurality of separate representations, wherein the combining is executed by at least one gated multimodal unit; and
generating a ranking for at least one of the tabular entities descriptions by combining the query and the joint representation.

According to a third aspect of some embodiments of the present invention, there is provided a computer implemented method of training a tabular data entities ranking system, the ranking is by likelihood of comprising answers for (natural language) queries, and the training comprising:
receiving a query and a plurality of descriptions of tabular entities, each description comprising a plurality of separate representations, and each of the plurality of separate representations represents a tabular data aspect;
generating a joint representation by combining a plurality of combined representations from the plurality of separate representations, wherein the combining is executed by at least one gated multimodal unit;
generating a ranking for at least one of the tabular entities descriptions by combining the query and the joint representation;
combining at least two representations from the plurality of separate representations for calculating of a joint loss; and
training at least one part of the tabular data entities ranking system using a loss function comprising the joint loss.

In a further implementation form of the first and/or second and/or third aspects, combining the query and the joint representation is executed by at least one additional gated multimodal unit.

In a further implementation form of the first and/or second and/or third aspects, the plurality of combined representations comprises three or more separate representations.

In a further implementation form of the first and/or second and/or third aspects, the machine learning based model comprises a neural network.

In a further implementation form of the first and/or second and/or third aspects, at least one representation from the plurality of separate representations is obtained by embedding, generated by a neural embedding model.

In a further implementation form of the first and/or second and/or third aspects, generating the ranking for the at least one of the tabular entities descriptions is further based on a prediction generated by the at least one of the plurality of separate representations.

In a further implementation form of the first and/or second and/or third aspects, generating the ranking for the at least one of the tabular entities descriptions is further based on combining the at least one of the plurality of separate representations and a representation generated for the query.

In a further implementation form of the first and/or second and/or third aspects, generating the ranking for the at least one of the tabular entities descriptions is further based on a relevance label for the separate prediction, wherein the predicting a relevance label was trained using at least one other prediction generated based on the plurality of separate representations.

In a further implementation form of the first and/or second and/or third aspects, the neural embedding model comprises a multi-dimensional convolutional neural network.

In a further implementation form of the first and/or second and/or third aspects, the neural embedding model comprises a multi-layer perceptron.

In a further implementation form of the third aspect, the calculating of a joint loss further comprises processing a representation generated for the query and one of the plurality of separate representations using a further additional gated multimodal unit.

In a further implementation form of the third aspect, the combining at least two representations is obtained by at least one further additional gated multimodal unit.

In a further implementation form of the third aspect, the calculating of a joint loss further comprises an aspect loss generated for at least one of the plurality of separate representations, wherein the aspect loss is based on a prediction generated by the at least one of the plurality of separate representations.

In a further implementation form of the third aspect, a separate prediction is generated based on at least one separate representations from the plurality of separate representations, wherein the separate prediction is trained to predict the tabular data entities ranking.

In a further implementation form of the third aspect, a separate prediction is generated based on at least one separate representations from the plurality of separate representations and a representation generated for the query, wherein the separate prediction is trained to predict the tabular data entities ranking.

In a further implementation form of the third aspect, there is provided predicting a relevance label for the separate prediction, wherein the predicting a relevance label is trained using at least one other prediction generated based on the plurality of separate representations.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DETAILED DESCRIPTION

Unless otherwise defined, all technical and/or scientific terms used herein have the same meaning as commonly understood by one of ordinary skill in the art to which embodiments. Although methods and materials similar or equivalent to those described herein may be used in the practice or testing of embodiments, exemplary methods and/or materials are described below. In case of conflict, the patent specification, including definitions, will control. In addition, the components, methods, and examples are illustrative only and are not intended to be necessarily limiting.

Shortcomings of prior art include not considering the special properties of different aspects of tabular data. For example, context of words may be inferred according to different properties along the different table axes, and both properties may differ from those inferring the word context in the table caption. Additionally, titles are often more significant and informative than what methods such as TF-IDF may imply, and some words may be used as indices or keys.

Some embodiments of the present invention involve processing the different aspects of a table as different sources of information, having different characteristics. Examples for such aspects may comprise a textual description of the table, a short caption, the table schema, the records of the table, the facets of the table, and aspects of the table structure.

Some embodiments of the present invention comprise using gated multimodal units (GMU) for generating joint representations of the embeddings of different properties, wherein the embeddings are generated by processing different aspects of the table. Some embodiments of the present invention may apply additional gated multimodal units to combine the joint representations with query representations, and/or support both query dependent and query independent representations, weighting, and ranking.

Some embodiments of the present invention apply joint loss for training, in order to enhance the correspondence between the embedding generated separately for each aspects. The joint loss may comprise helper labels generated by unimodal and multimodal components. Furthermore, the joint loss may comprise query dependent and query independent loss.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, scripting languages such as Python, Lua or the likes mathematical and machine learning specific languages such as Caffe, LISP, or the likes, conventional procedural programming languages, such as the "C" programming language or similar programming languages. The computer readable program instructions may execute entirely on the user's computer, partly on the user's computer, as a stand-alone software package, partly on the user's computer and partly on one or more remote computers or entirely on the one or more remote computers or servers. In the latter scenario, the one or more remote computers may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

Figure 1:
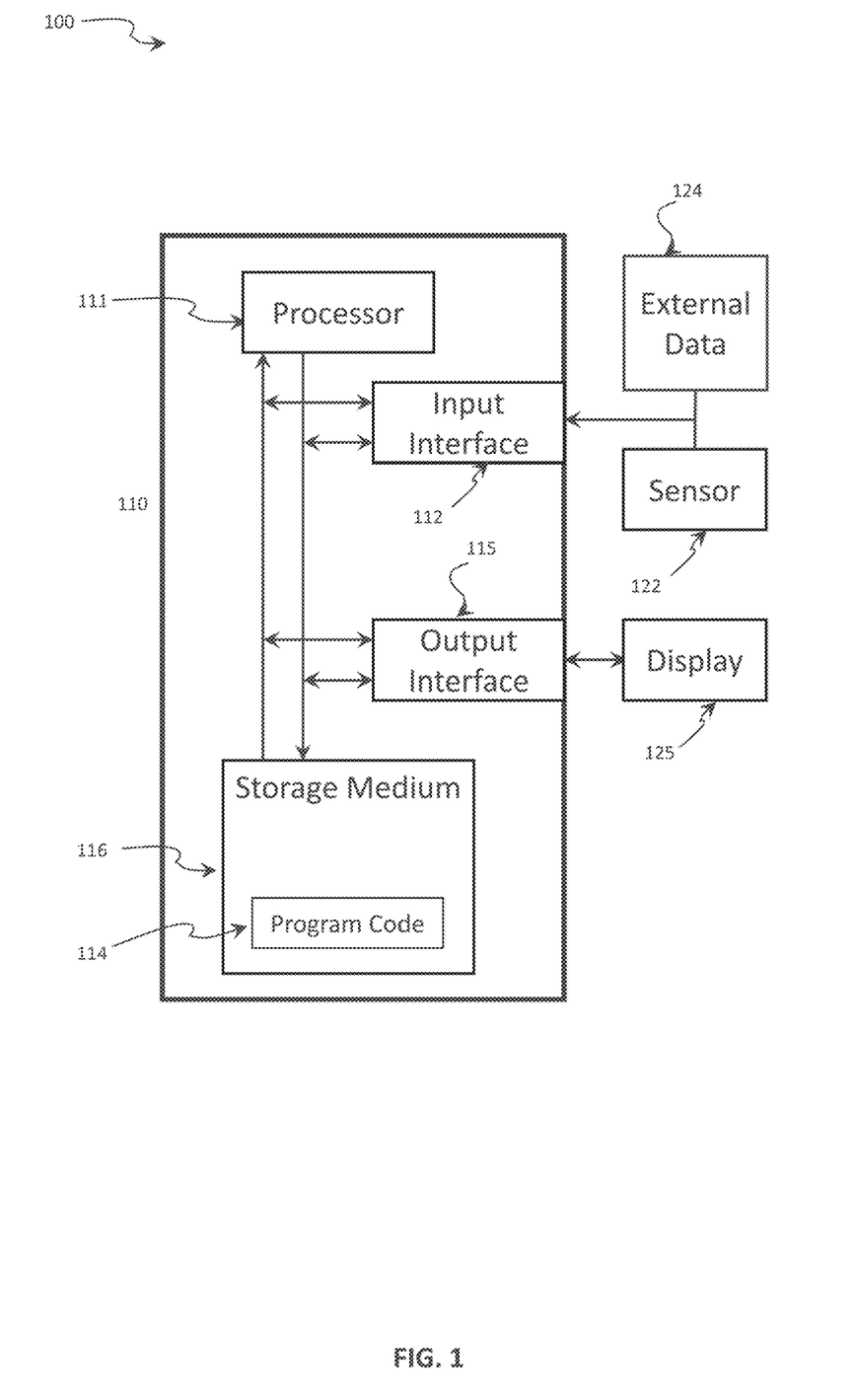
FIG. 1 is a schematic illustration of an exemplary system for table retrieval using multimodal deep co-learning with helper query-dependent and query-independent relevance labels, according to some embodiments of the present disclosure.

Referring now to the drawings, FIG. 1 is a schematic illustration of an exemplary system for table retrieval, according to some embodiments of the present disclosure. An exemplary inference system 100 may execute processes, such as processes 200 and/or 300, which are described in FIG. 2 and FIG. 3 respectively, and may be applied for training a system for table retrieval, and/or using the system or the device for ranking, respectively. The system may be used, for example, to answer one or more queries submitted by a user.

The inference system 100 may include an input interface 112, an output interface 115, a processor 111, and a storage medium 116 for storing a program code 114 and/or data. The processor 111 may execute program code 114 for implementing process 200 and/or process 300, which are described in FIG. 2 and FIG. 3 respectively. The inference system 100 may be implemented on one or more computers, compute server, and or the likes, physically located on a site, and/or implemented, as a distributed system, virtually on a cloud service, on machines also used for other functions, and/or by several other options.

Alternatively, the system 100 may be implemented on a mobile device, a programmable cellular phone, a tablet, and/or the likes.

Further alternatively, the system may comprise dedicated hardware, ASIC, FPGA, and/or the likes. It should be noted that application-specific hardware may account for better speed and lower power consumption, however, at a potential cost of additional resources required during design and limit flexibility in system updates. Hardware with strong parallel processing capabilities, such as one or more single instruction multiple data (SIMD) processors, digital signal processing (DSP) hardware, graphics processing unit (GPU), tensor processing unit (TPU), and/or the likes may be used to improve speed and accuracy, as training and inferring using neural networks and similar machine learning models may benefit from these capabilities.

The input interface 112 and the output interface 115 may comprise one or more wired and/or wireless network interfaces for connecting to one or more networks, for example, a local area network (LAN), a wide area network (WAN), a metropolitan area network, a cellular network, the internet and/or the like. The input interface 112 and the output interface 115 may further include one or more wired and/or wireless interconnection interfaces, for example, a universal serial bus (USB) interface, a wireless local area network (WLAN), and/or the like. Furthermore, the output interface 115 may include one or more wireless interfaces for loudspeakers, display, updating of external systems such as recommender systems, and/or the like, as well as other processors executing post-processing. The input interface 112 may include one or more wireless interfaces for receiving information from one or more devices. Additionally, the input interface 112 may include specific means for communication with one or more sensor devices 122 such as a camera, microphone, keyboard, touchscreen, mouse, scanner and/or the like. The input interface may be configured to access external data 124, such as datasets, web tables, dynamically updated analytics, and/or the likes, which are stored outside the system. Similarly, the output interface 115 may include specific means for communication with one or more display devices 125 such as a loudspeaker, screen, projector and/or the like. Furthermore, the display device may comprise a model, device, and/or the likes, which executes further processing on the ranking generated by the system. The output may be further used to update charts, tables, databases, and/or the likes, which may be stored on other systems, the cloud, displayed on a web page through the internet, and/or the likes.

Data describing tabular entities, their properties, and/or embeddings thereof may be received through the input interface 112, from the storage medium 116, and/or the likes. It should be emphasized that it also comprises batches of tabular entities descriptions, properties, and/or embeddings thereof, as introduced to machine learning models in some applications.

The processor 111 may be homogenous or heterogeneous and may include one or more processing nodes arranged for parallel processing, as clusters and/or as one or more multicore processors. The storage medium 116 may include one or more non-transitory persistent storage devices, for example, a hard drive, a Flash array, a removable media, and/or the like. The storage medium 116 may also include one or more volatile devices, for example, a random access memory (RAM) component and/or the like. The storage medium 116 may further include one or more network storage resources, for example, a storage server, a network attached storage (NAS), a network drive, and/or the like, accessible via one or more networks through the input interface 112 and the output interface 115. Furthermore, faster access storage hardware such as dedicated registers, latches, caches, context addressable memory, and/or the likes may be used to enhance processing speed. Data that has to be accessed frequently such as parameters of the neural network may be stored using faster access devices, such as caches or video random memory (VRAM), while data that is accessed rarely such as tables relevant only to uncommon queries may be stored using slower, yet more flexible and inexpensive means such as a network attached storage, a cloud service, or using a third party service as shown in 124.

The processor 111 may execute one or more software modules such as, for example, a process, a script, an application, an agent, a utility, a tool, an operating system (OS) and/or the like each comprising a plurality of program instructions stored in a non-transitory medium within the program code 114, which may reside on the storage medium 116. For example, the processor 111 may execute a process, comprising inference or training of a system for table retrieval such as process 200, 300, which are described in FIG. 2 and FIG. 3 respectively. The processor 111 may generate inferences, rankings, and/or the like, Furthermore, the processor 111 may execute one or more software modules for online or offline training of one or more components of the system for table retrieval, as well as auxiliary models.

Figure 2:
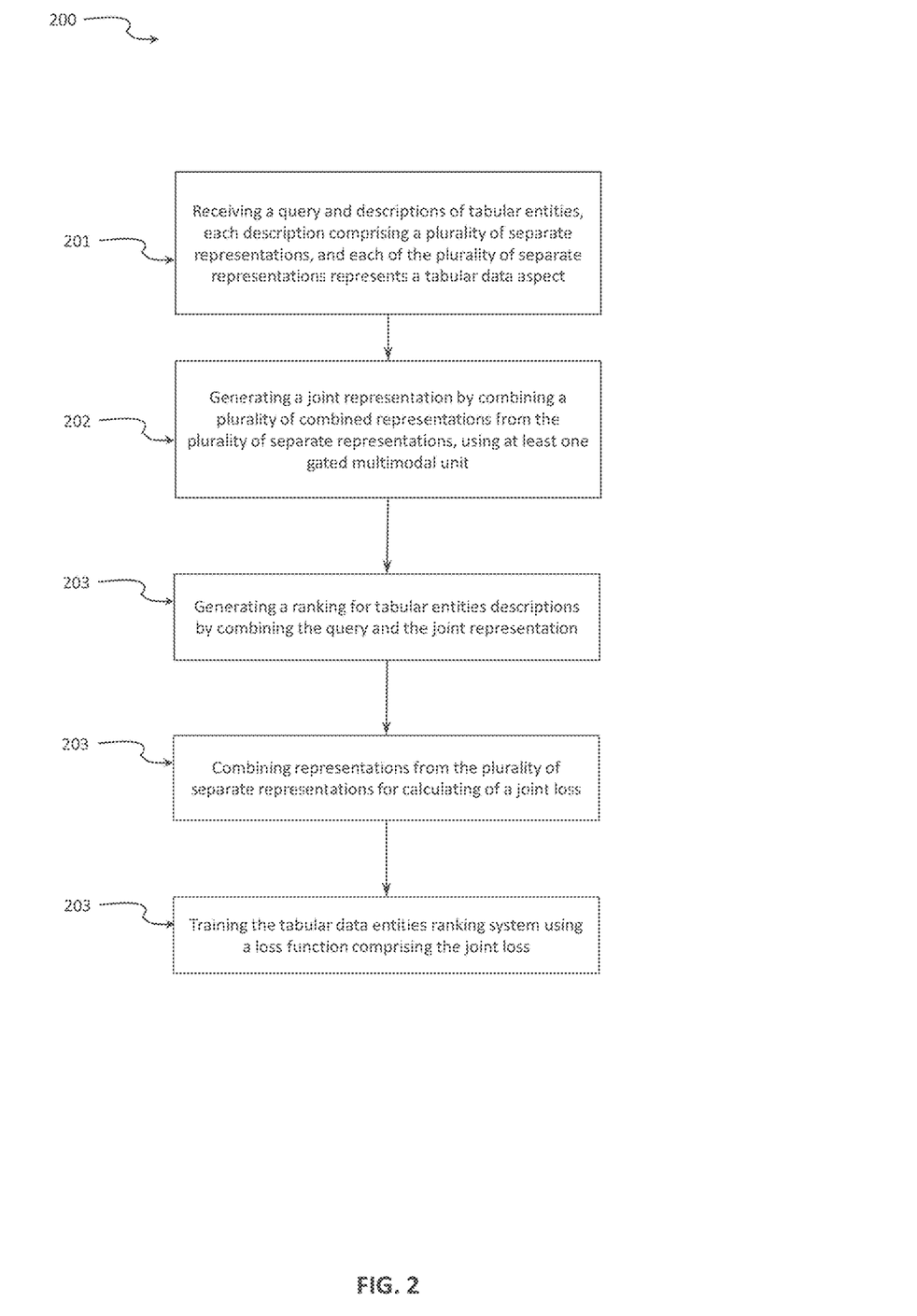
FIG. 2 is a flowchart of an exemplary process for training a system for table retrieval using multimodal deep co-learning with helper query-dependent and query-independent relevance labels, according to some embodiments of the present disclosure.

Reference is also made to FIG. 2, which is a basic a flowchart of an exemplary process for training a system for table retrieval using multimodal deep co-learning with helper query-dependent and query-independent relevance labels, according to some embodiments of the present disclosure. The exemplary process 200 may be executed for a variety of automatic and semi-automatic purposes involving table retrieval, for example question answering, web search, analytics, research, recommendations and/or the like.

The exemplary process 200 starts, as shown in 201, with receiving a query and descriptions of tabular entities, each description comprising a plurality of separate representations and each of the plurality of separate representations represents a tabular data aspect.

The terms tabular data entity, tabular entity, or table are used herein to mean a table, a matrix, a tensor, a structured text file in a format such as xml or json, a text file or part thereof which comprises at least one table, or other data structures in which the location of an element or a cell induce meaning to its contents, or relation with contents of other cells or elements.

Figure 4:
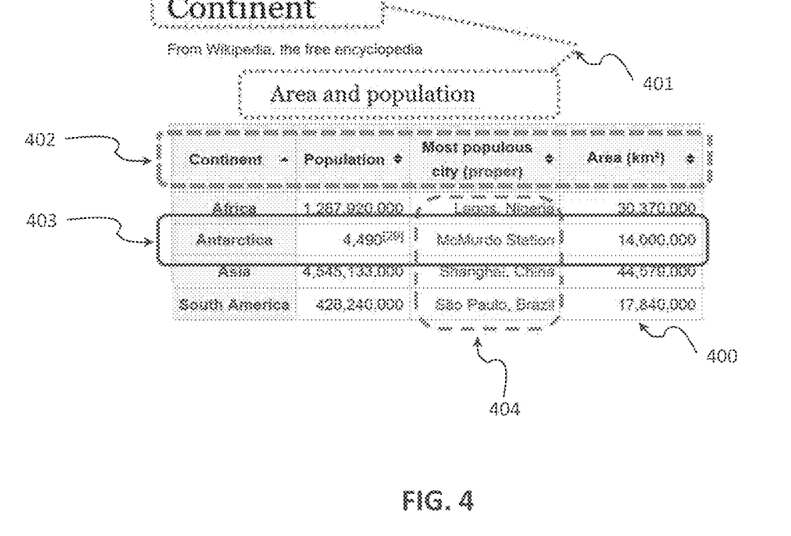
FIG. 4 is an exemplary table with marks surrounding four exemplary properties, according to some embodiments of the present disclosure.
Figure 5:
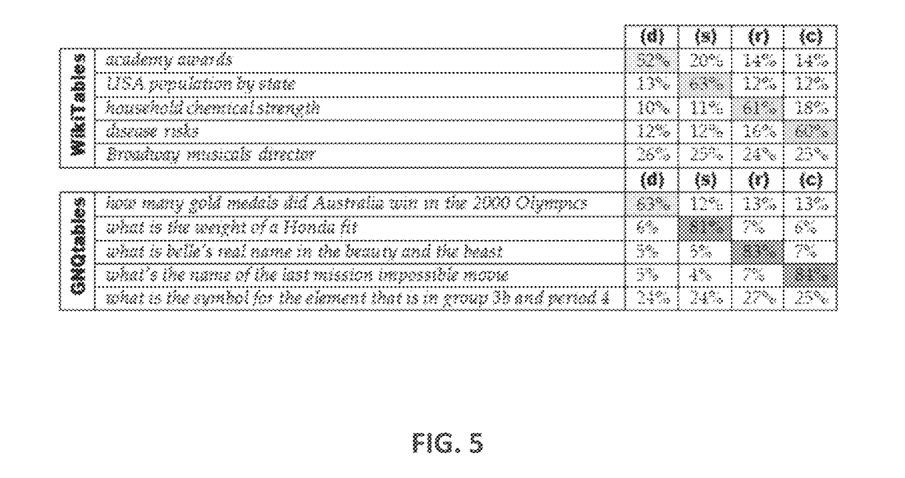
FIG. 5 is an exemplary table showing how informative were the four exemplary properties of a table for a given query, according to some embodiments of the present disclosure.

Examples of queries are shown in FIG. 5. Examples of properties or data aspects of tabular data entities are shown in FIG. 4. The separate representations of the tabular data aspects may comprise list of words, with or without symbols expressing aspects of the tabular entity structure. Additionally or alternatively, the representations may comprise encoded and/or embedded representation of one or more properties of the tabular data entity. Examples of encoding of queries, tabular data aspect and/or properties are described in FIG. 5.

The exemplary process 200 continues, as shown in 202, with generating a joint representation by combining a plurality of combined representations from the plurality of separate representations, using at least one gated multimodal unit.

A gated multimodal unit is a model for multimodal learning based on gated neural networks, which may be used as an internal unit in a neural network architecture whose purpose is to find an intermediate representation based on a combination of data from different modalities. A gated multimodal unit may further learn to assign weights, controlling how modalities influence the activation of the unit using one or more multiplicative gates. Alternatively, a gated multimodal unit may be implemented using Markov random fields, Boltzmann machines, and/or the likes.

The joint representation is based on all, or a selection of the separate representations.

The exemplary process 200 continues, as shown in 203, with generating a ranking for tabular entities descriptions by combining the query and the joint representation.

The combining of the query and the joint representation may be executed using an additional gated multi modal unit. Alternatively, the combining may be executed by look up tables, Boltzmann machines, autocoders, other neural models, and other embedding models.

The exemplary process 200 continues, as shown in 204, with combining representations from the plurality of separate representations for calculating of a joint loss.

The joint loss is based on a plurality of prediction based on the joint representation, separate representations, weights from gated multimodal units, query dependent and query independent predictions, and other elements of the tabular data entities ranking system. The joint loss, for example, may be an additive, multiplicative, logarithmic, and/or the like sum of predictions, and may be weighted according to relevance, or helper, labels. The relevance labels may be used as weights, and they may be used as a confidence measure for the separate prediction. The relevance labels are relevance predictions trained using one or more predictions, which are based on one or more of the other separate representations. By a joint loss-function, the model may propagate feedback back to the elements, layers, and sub-elements in the network based on the relative contribution of each one of the helper or relevance labels to the overall system accuracy. This in turn, may improve the intermediate representation of the query $h_q$ and the unimodal, or separate representations $h_m$, which are further described in FIG. 6, and as a result, further improve the multimodal table representation The exemplary process 200 continues, as shown in 205, with training the tabular data entities ranking system using a loss function comprising the joint loss.

The training may comprise updating parameters of elements, layers of the elements, sub-elements, and/or the likes in the model. The parameters may be updated to reduce the joint loss function as calculated for the tabular data entities ranking system.

The automatically learned auxiliary relevance, or helper labels have the potential to improve model training by sharing knowledge among labels, for example in cases where some modalities might not be well represented in the training data due lack of annotation or noise, unreliability, and/or the likes. The co-learning may be based on a non-parallel data approach, where no dependence between modality is presumed, and may not be directly present in the training data. The training may be based only on the availability of a training data that comprises relevance labels for tabular data entities as a whole answers, and no relevance labeling per table modality is required. Therefore, helper labels may be automatically or implicitly derived and utilized for training Other cost or loss functions, such as cross entropy, pair-wise ranking, additive, angular, contrastive, and/or the likes and/or surrogates and variants thereof may be also be used, or optimized during training by updating parameters associated with one or more elements, layers, sub-elements and/or the likes of the tabular data entities ranking system.

Stochastic gradient descent is an exemplary method for updating parameters of the tabular data entities ranking system, its elements, sub-elements thereof, and/or the likes. However, other optimization methods and variants thereof may be used. For example, adaptive learning rates such as Adam or Adagrad, and/or momentum.

It should be noted that transfer learning, and other supervised, semi-supervised, or unsupervised training methods known to the skilled in the art, may be used for training the tabular data entities ranking system.

The flowchart mentions a processing of one single exemplary description of a tabular entity, or a batch thereof, executed during the training process. However, as known to those skilled in the art, implementations may repeat the process, execute interim validation, update parameters, and apply regularization and/or the likes during the training process.

Figure 3:
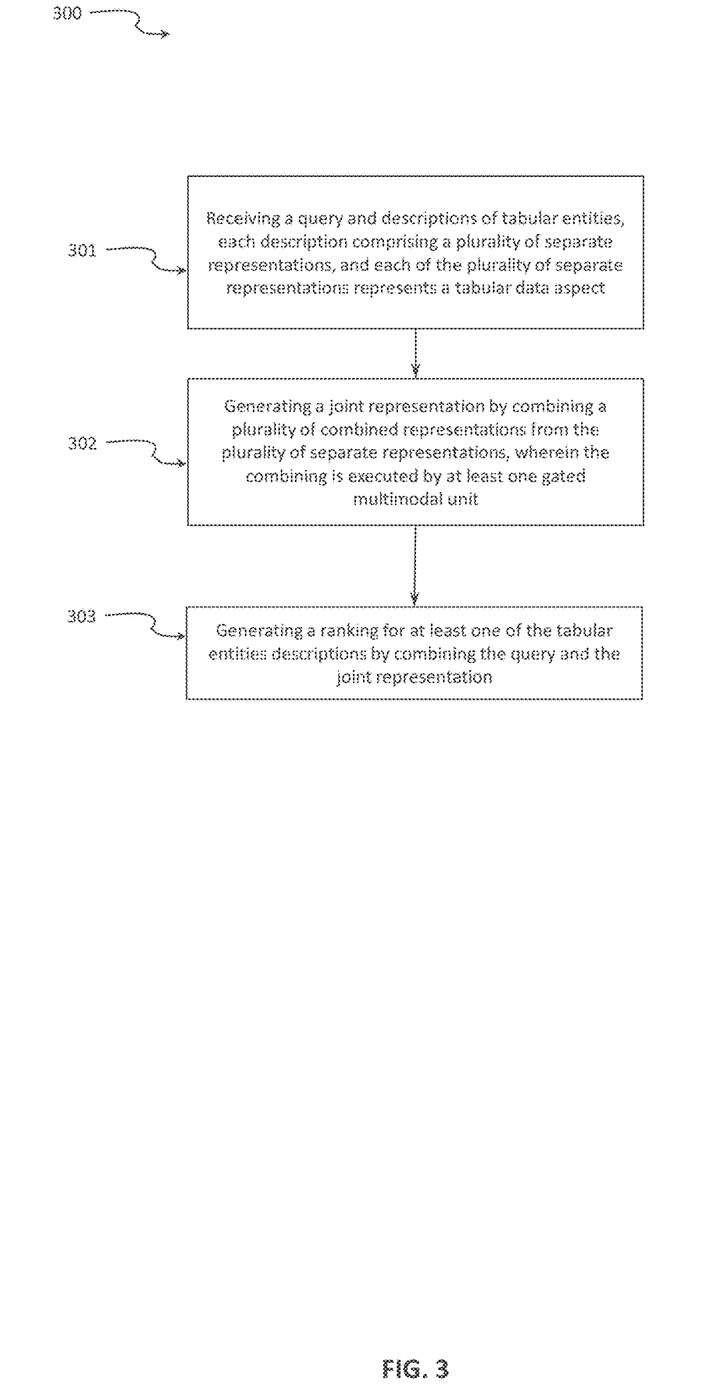
FIG. 3 is a flowchart of an exemplary process for table retrieval using multimodal deep co-learning with helper query-dependent and query-independent relevance labels, according to some embodiments of the present disclosure.

Reference is also made to FIG. 3, which is a flowchart of an exemplary process for table retrieval using multimodal deep co-learning with helper query-dependent and query-independent relevance labels, according to some embodiments of the present disclosure.

The exemplary process 300 may be executed as a part of a variety of automatic and semi-automatic purposes involving table retrieval, for example question answering, web search, analytics, research, recommendations and/or the like.

The process 200 may start, as shown in 301, with receiving a query and descriptions of tabular entities, each description comprising a plurality of separate representations, and each of the plurality of separate representations represents a tabular data aspect.

The query and the descriptions of tabular entities may be received form the input interface 112, from an internet interface, a sensor such as a keyboard for ad-hoc queries or a scanner for printed data, a dataset such as WikiTables or GNQtables, and/or the likes. The representations may be received directly or in an embedded, hashed, or encoded format.

The process may continue, as shown in 302, with generating a joint representation by combining a plurality of combined representations from the plurality of separate representations, wherein the combining is executed by at least one gated multimodal unit.

The joint representation may be generated similarly to 202 described in FIG. 2, however it may vary due to regularization methods, security constraints, regulation compliance, cost optimization, and/or the likes.

The process may finish, as shown in 303, with generating a ranking for at least one of the tabular entities descriptions by combining the query and the joint representation.

The ranking may be submitted to a user through the output interface 115. The ranking may be prediction for the relevance of the tabular entity for the query, or one or more tables, descriptions, links and/or the like of tabular entities whose relevance predictions is higher than that of others, meet a certain criterion, and/or the like. The ranking may be based on one or more of the joint prediction, the separate predictions, the query dependent predictions, the query independent predictions, and other elements of the tabular data entities ranking system. The prediction may be a weighted sum of the prediction, wherein weights may be based on corresponding elements, such as relevance or helper labels, of one or more of the gated multimodal units.

Attention is now drawn to FIG. 4, which is an exemplary table with marks surrounding four exemplary properties, according to some embodiments of the present disclosure.

The exemplary table 400 is a simple, openly public domain, table, however the disclosure may be used on larger, more complex, proprietary tables, and/or the likes.

The first property used in this example is the description 401, which may comprise a title, subtitle, description of the sources, a paragraph of text describing the table, and/or the likes. The description may comprise complete natural language sentences. The table's description may include all text that accompanies the table, yet the description may not include text within the table itself. This modality may provide general, descriptive information on the table's content which improves its readability. Such information may include the table's containing page title, section title and caption. The table's description may be written in a natural language textual form, and therefore, it may be directly matched against text queries.

The second property used in this example is the schema 402, with or may comprise one or more rows of the table in which column titles and optionally a hierarchy of sub-columns and the likes. The schema may be an ordered list, and may comprise full sentences, sentences wherein words were omitted for brevity, half sentences, sets of one or a few more words, and/or the likes. The table's schema imposes a structure on the table's content and in its simplest form includes several attributes. The schema is also referred to as table column names, headers or headings. Each schema attribute may have a label and corresponds to one or more column of the table. To some extent, each schema attribute may have a semantic role in implying what type of data may be populated within the corresponding table column's cells. Column names may be very short in text, may be abbreviated and even hard to interpret by humans. Moreover, some table schemata may capture metadata level information, having complex semantic structures, such as hierarchical dependencies, data constraints, and/or the likes.

The third property used in this example is the records, 403, which may comprise a list of the table entries or rows, with or without identifiers, empty cells, indications about table structure, and/or the like. The table's records, entries, or rows, consists of several data cells; having each cell commonly correspond to one or more of the table columns. Records may represent entities of interest, or facts that may be used for answering queries that require selecting more specific information from the tables.

The fourth property used in this example is the facets, 403, which may comprise a list of the table facets, or columns, with or without titles, empty cells, indications about table structure, and/or the like. The facets vertically divide the table data, where each facet may be defined by the group of table records' cell values that correspond to a specific table column Facets may allow answering queries that express information needs about one or more, possibly aggregative, properties of one or more groups of records.

Note that preprocessing such as tokenization, padding, and addition of symbols indication structural cues such as end of column, end of row, column or row splitting, merging, and/or the likes may be further applied. Additionally or alternatively, pre-trained word embeddings such as GLoVe or Word2Vec may be used.

For an exemplary query: "area and population of continents" considering the table's description may be effective. For a query like "the most populated city by continent", the table's heading 'Most populous city' is already informative enough. On the other hand, for queries with more specific data-oriented intents, the records for example "population of Asia" or the facets, e.g. "comparison of Asia and Africa continents", are more indicative on the table's relevance. In some cases, though, estimating a given web table's relevance to a given user query may require to evaluate the query against all the table's properties, individually and jointly.

It should be emphasized that the invention is not limited to the choice of tabular entity properties described herein, and other properties that may relate to the table structure, grouping of rows and/or columns, diagonals, selection of segments, parts of columns or part of the columns, a choice of rows, rectangular windows comprising several rows and columns, triangular windows, and/or the like may be used in other implementations of this disclosure.

Reference is now made to FIG. 5, which is an exemplary table showing how informative were the four exemplary properties of a table for a given query, according to some embodiments of the present disclosure.

The experiment that gave rise to this exemplary table was executed using an implementation of this disclosure, on the WikiTables and GNQtables datasets. The text with white background describes a query. The four columns show how informative was each property of the tabular entities in the dataset: the description (d), the schema (s) the records (r) and the facets (c). The percentages of how informative each property was are shown with a bright background for the less informative properties and darker backgrounds for the more informative. For example, the description was most informative about "academy awards", the schema was the most informative property about "disease risks", and the information was approximately evenly distributed between the four properties for "Broadway musical director". It should be noted that other implementations of the disclosure may give rise to different experiment results.

Figure 6:
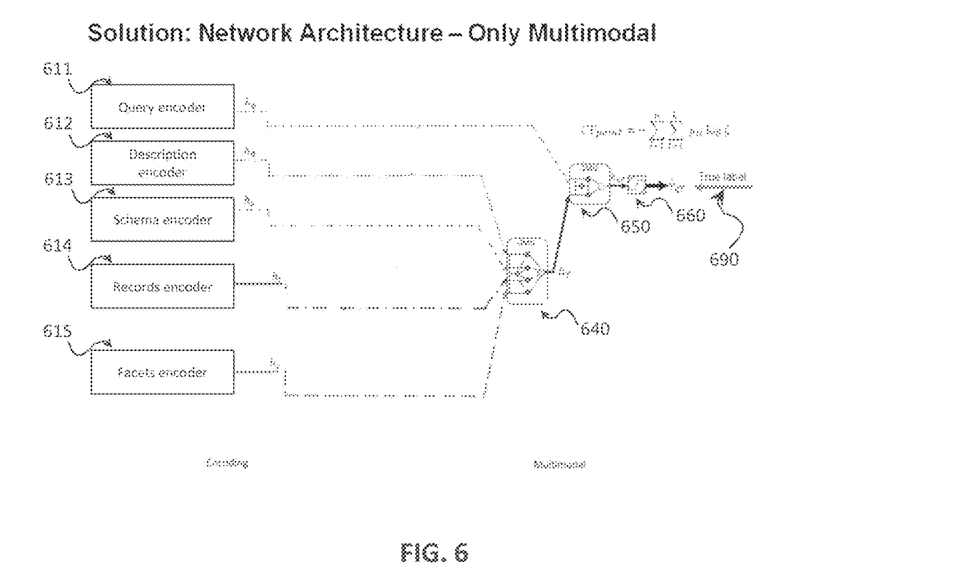
FIG. 6 is a diagram illustrating an exemplary system for table retrieval using multimodal deep co-learning, according to some embodiments of the present disclosure.

Reference is now made to FIG. 6, which is a diagram illustrating an exemplary system for table retrieval using multimodal deep co-learning, according to some embodiments of the present disclosure.

The system receives a query, which may be processed and encoded by a query encoder 611, generating a query encoding $h_q$ and four exemplary properties of the tabular entity. The properties used in this example include description, processed and encoded by a description encoder 612, generating a description encoding $h_d$, schema, processed and encoded by a schema encoder 613, generating a schema encoding $h_s$, records, which are processed and encoded by a records encoder 614, generating a records encoding $h_r$, and facets, which are processed and encoded by a facets encoder 615, generating the facet encoding $h_c$. It should be noted that the encodings or embeddings other than the first, query encoding, may be referred to as modality encoding or $h_m$.

Encoders may comprise an application specific word embedding, or a pretrained word embedding such as global vectors (GLoVe), bidirectional encoder representations from transformers (BERT), other neural embedding models and/or the likes. Encoders may further comprise neural networks such as recurrent convolutional neural networks (RCNN), long short-term memory (LSTM), bidirectional long short-term memory, neural networks comprising gated recurrent units (GRU), convolutional neural networks of vectors, matrices, three or more dimensional tensors such as three-dimensional convolutional neural network (3D-CNN). For example, a neural network may have some dimensions associated with the tabular data entity structure, and other dimensions associated with the token embedding. Neural network layers may comprise activation layers such as hyperbolic tangent (TANH), rectifiers such as rectified linear unit (RELU), leaky rectified linear unit, and/or the likes. Neural networks may further comprise pooling layers, which may capture the more informative latent factors.

Encoders may further comprise multi-layer perceptrons (MLP), which may comprise one or more fully connected layers, concatenations of sequences of hidden states, and one or more additional fully connected layers.

Furthermore, other encoding or embedding methods and models such as random fields, Markov random fields (MRF), autocoders, descriptors, compression methods, and/or the likes may be used for encoding tabular data entity properties.

The joint gated multimodal unit 640 generates the joint representation of the tabular entity properties $h_T$. Gated multimodal units are multimodal encoder components, which may be used for obtaining joint-representations of two or more different modalities. The modalities may differ in dimensions. A gated multimodal unit may obtain one or more intermediate representations, for each modality based on an independent encoding of associated original representation. A plurality of inputs may be combined using a gate neuron controlling the contribution or relevance of one or more of the joint representation elements. Furthermore, an out layer may be used in the output layer for converting a given representation to a relevance label prediction, which indicates a confidence level that may be assigned to the associated separate representation. The relevance label may be multiplied with the prediction generated by the comparative representation for prediction or calculation of the contribution to the joint loss. The gated multimodal unit may combine both early and late fusion approaches. The representation may comprise elementwise multiplication of representation elements and associated relevance labels. An additional gated multimodal unit 650 may combine the joint representation with the query encoding $h_q$, generating the query dependent joint representation $h_{qT}$. Further, a joint logit processor 660 generates the query dependent joint prediction $\hat{y}_{qT}$, which is based on the separate representations and a representation generated for the query. Logit processors may be softmax, sigmoid, and/or the likes.

The ranking or inference may be based on the joint prediction. During training, the loss may be based on the true label 690 and the joint predictions.

Figure 7:
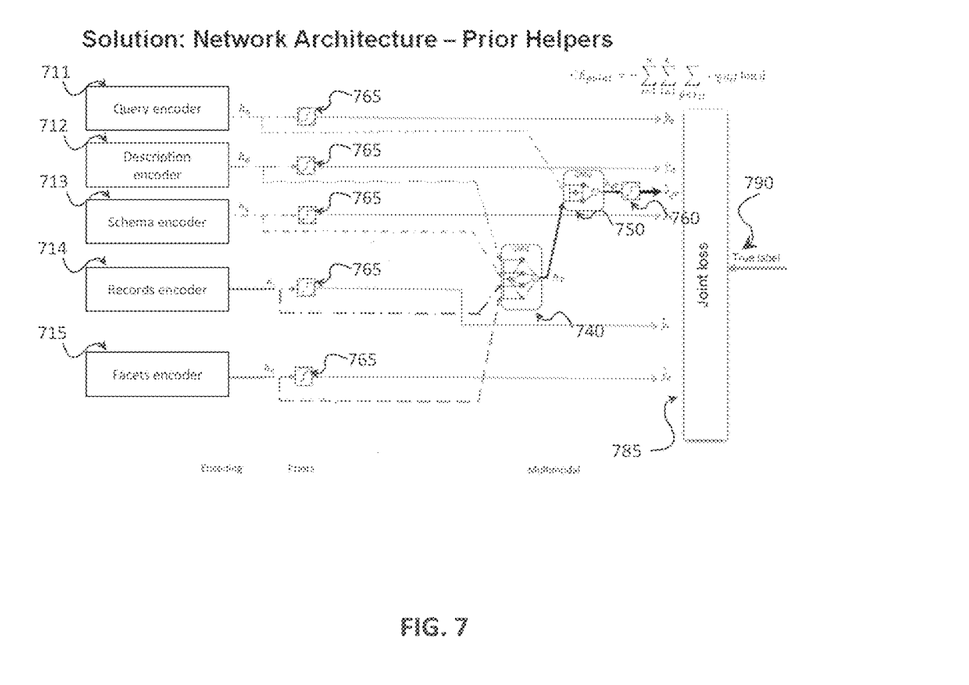
FIG. 7 is a diagram illustrating an exemplary system for table retrieval using multimodal deep co-learning, with helper query-independent relevance labels, according to some embodiments of the present disclosure.

Reference is now made to FIG. 7, which is a diagram illustrating an exemplary system for table retrieval using multimodal deep co-learning, with helper query-independent relevance labels, according to some embodiments of the present disclosure;

It should be noted that the FIG. 7 comprises elements similar to the elements present in FIG. 6 and additional elements giving rise to query-independent relevance labels and predictions. The system, similarly to the systems disclosed in FIG. 6, receives a query, which may be processed and encoded by a query encoder 711, generating a query encoding $h_q$ and four exemplary properties of the tabular entity. The properties used in this example include description, processed and encoded by a description encoder 712, generating a description encoding $h_d$, schema, processed and encoded by a schema encoder 713, generating a schema encoding $h_s$, records, which are processed and encoded by a records encoder 714, generating a records encoding $h_r$, and facets, which are processed and encoded by a facets encoder 715, generating the facet encoding $h_c$. Optionally, the encoders 711,712,713,714 and 715 are similar to 611,612,613,614 and 615 respectively, as shown in FIG. 6, however architectures, parameters, meta-parameters, and/or the like may vary between implementations.

The outputs of these decoders are processed through a comparative logit processor each 765, generating the $\hat{y}_q$ from the query encoder output, $\hat{y}_d$ from the description encoder output, $\hat{y}_s$ from the schema encoder output, $\hat{y}_r$ from the records encoder output, and $\hat{y}_c$ from the facets encoder output.

The joint gated multimodal unit 740 generates the joint representation of the tabular entity properties $h_T$, and an additional gated multimodal unit 750 combines the joint representation with the query encoding $h_q$, generating the query dependent joint representation $h_{qT}$. Further, a joint logit processor 760 generates the query dependent joint prediction $\hat{y}_{qT}$.

The ranking, or inference may be based on one, some, or all the predictions, and may be weighted in accordance to relevance or confidence predictions, which may be generated by the encoders and/or the gated multimodal units. During training, the joint loss 785 may be based on the true label 790 and on one, some, or all the predictions, including the joint and the separate predictions, or the query independent predictions. Optionally, the joint gated multimodal unit 740, the additional gated multimodal unit 750, and the joint logit processor 760 are similar to 640, 650 and 660 as shown in FIG. 6, however architectures, parameters, meta parameters and/or the likes may vary between implementations.

Figure 8:
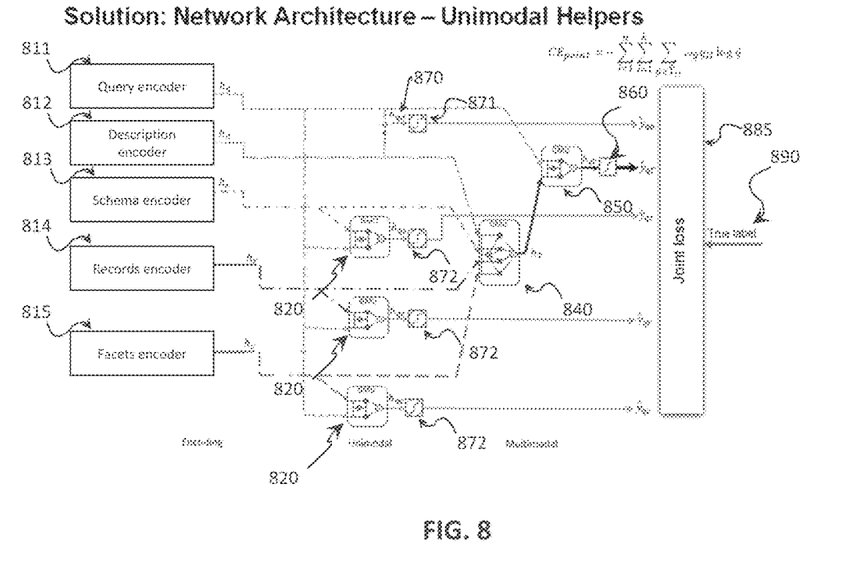
FIG. 8 is a diagram illustrating an exemplary system for table retrieval using multimodal deep co-learning, with helper query-dependent relevance labels, according to some embodiments of the present disclosure.

Reference is now made to FIG. 8, which is a diagram illustrating an exemplary system for table retrieval using multimodal deep co-learning, with helper query-dependent relevance labels, according to some embodiments of the present disclosure;

It should be noted that the FIG. 8 also comprises elements similar to the elements present in FIG. 6. However, the additional elements give rise to query-dependent relevance labels and predictions. The system, similarly to the systems disclosed in FIG. 6 and FIG. 7, receives a query, which may be processed and encoded by a query encoder 811, generating a query encoding $h_q$ and four exemplary properties of the tabular entity. The properties used in this example include description, processed and encoded by a description encoder 812, generating a description encoding $h_d$, schema, processed and encoded by a schema encoder 813, generating a schema encoding $h_s$, records, which are processed and encoded by a records encoder 814, generating a records encoding $h_r$, and facets, which are processed and encoded by a facets encoder 815, generating the facet encoding $h_c$. Optionally, the encoders 911,912,913,914 and 915 are similar to 611,612,613,614 and 615 respectively, as shown in FIG. 6, however architectures, parameters, meta parameters, and/or the like may vary between implementations.

The description property of web tables, which may be given in a textual form, may be assumed directly comparable with user queries. Hence, both user queries and web table descriptions may be represented in a similar way. The textual descriptive parts of a table such as the title and the caption may be directly matched against textual queries by applying, for example, an element-wise operator. Opposite to that, each one of the structurally-rich web table properties, for example, schema, records and facets, may be assumed to consist of a unique data modality of its own, where it may indicate the relevance of a given web table by different signals.

Optionally, the description is encoded by the description encoder in an encoding compatible with that of the query encoder, and thus matched to the output of the query encoder using a straightforward matcher such as a dot product matcher 870, generating $h_{qd}$, and another logit processor 871 generates the query dependent description prediction $\hat{y}_{qd}$.

Optionally, the schema, records, and facets are encoded by different encoders each, which do not share encoding or embedding with the query decoder, or one with the other, and thus their outputs, $h_s$, $h_r$, and $h_c$ respectively, are incompatible with the encoding of the query encoder output $h_q$. Therefore, a further additional, respective gated multimodal unit 820 generates a combined encoding of the schema, records, and facets with the query, i.e. $h_{qs}$, $h_{qr}$, and $h_{qc}$ respectively. The combined encodings may be processed by an additional comparative logit processor 872 to generate the other query dependent predictions; the schema query dependent prediction $\hat{y}_{qs}$, the records query dependent prediction $\hat{y}_{qr}$, and the facets query dependent prediction $\hat{y}_{qc}$.

The joint gated multimodal unit 840 generates the joint representation of the tabular entity properties $h_T$, and an additional gated multimodal unit 850 combines the joint representation with the query encoding $h_q$, generating the query dependent joint representation $h_{qT}$. Further, a joint logit processor 860 generates the query dependent joint prediction $\hat{y}_{qT}$.

The ranking, or inference may be based on one, some, or all the predictions, and may be weighted in accordance to confidence predictions, which may be generated by the encoders and/or the gated multimodal units. During training, the joint loss 885 may be based on the true label 890 and on one, some, or all the predictions, including the joint and the separate query dependent predictions. Optionally, the joint gated multimodal unit 840, the additional gated multimodal unit 850, and the joint logit processor 860 are similar to 640, 650 and 660 as shown in FIG. 6, however architectures, parameters, meta parameters and/or the likes may vary between implementations. Similarly, the joint loss 885 and the true label 890 may be similar to 785 and 790 respectively, as shown in FIG. 7, however the joint loss 985 may be based on additional predictions and/or omit one or more predictions from 785, and parameters, functions, and/or the like.

Figure 9:
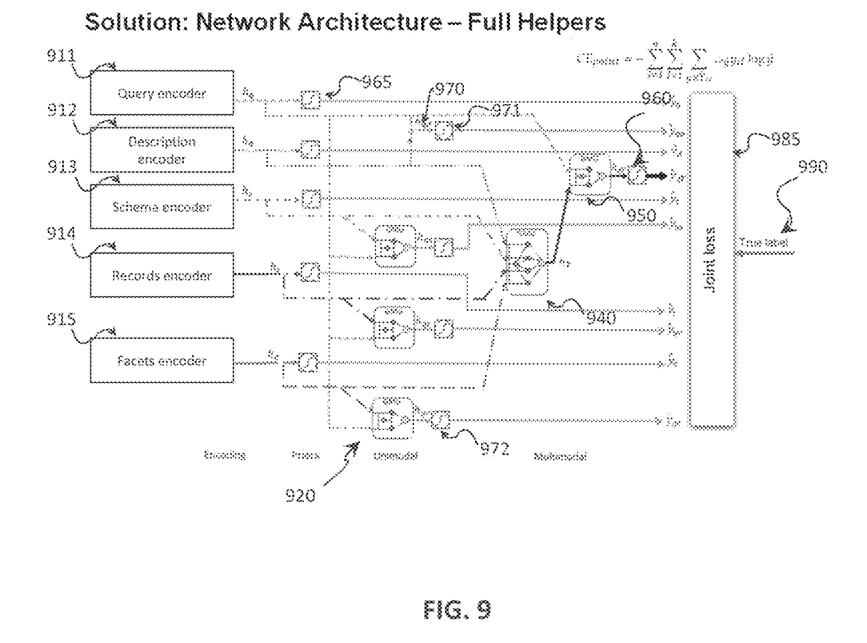
FIG. 9 is a diagram illustrating an exemplary system for table retrieval using multimodal deep co-learning with helper query-dependent and query-independent relevance labels, according to some embodiments of the present disclosure.

Reference is now made to FIG. 9, which is a diagram illustrating an exemplary system for table retrieval using multimodal deep co-learning with helper query-dependent and query-independent relevance labels, according to some embodiments of the present disclosure.

The system, integrates features disclosed in FIG. 6, FIG. 7, and FIG. 8, and similarly to these systems receives a query, which may be processed and encoded by a query encoder 911, generating a query encoding $h_q$ and four exemplary properties of the tabular entity. The properties used in this example include description, processed and encoded by a description encoder 912, generating a description encoding $h_d$, schema, processed and encoded by a schema encoder 913, generating a schema encoding $h_s$, records, which are processed and encoded by a records encoder 914, generating a records encoding $h_r$, and facets, which are processed and encoded by a facets encoder 915, generating the facet encoding $h_c$. Optionally, the encoders 911,912,913,914 and 915 are similar to 611,612,613,614 and 615 respectively, as shown in FIG. 6, however architectures, parameters, meta-parameters, and/or the like may vary between implementations.

The outputs of these decoders are processed through a comparative logit processor each 965, generating the separate predictions $\hat{y}_q$ from the query encoder output, $\hat{y}_d$ from the description encoder output, $\hat{y}_s$ from the schema encoder output, $\hat{y}_r$ from the records encoder output, and $\hat{y}_c$ from the facets encoder output. Note that for the sake of readability, the pointer to 965 points only to the query logit processor, however it should be construed to refer also to the logit processors of the description, schema, records, and facets. The comparative logit processors 965 may be similar to 665 as shown in FIG. 6, however logit functions, parameters, and/or the like may vary between implementations.

Optionally, the description is encoded by the description encoder in an encoding compatible with that of the query encoder, and thus matched to the output of the query encoder using a straightforward matcher 970 such as a dot product matcher, generating $h_{qd}$, and another logit processor 971 generates the query dependent description prediction $\hat{y}_{qd}$. Optionally, the straightforward matcher 970 and the another logit processor 971 are similar to 870 and 871 respectively, as shown in FIG. 8, however logit functions, parameters, comparison methods, and/or the like may vary between implementations.

Optionally, the query dependent predictions and relevance labels are generated similarly to the method described in FIG. 8, however, architectures, parameters, meta-parameters, and/or the like may vary between implementations. A respective gated multimodal unit 920 generates a combined encoding of the schema, records, and facets with the query, i.e. $h_{qs}$, $h_{qr}$, and $h_{qc}$ respectively. The combined encodings may be processed by an additional comparative logit processor 972 to generate the other query dependent predictions; the schema query dependent prediction $\hat{y}_{qs}$, the records query dependent prediction $\hat{y}_{qr}$, and the facets query dependent prediction $\hat{y}_{qc}$. Note that for the sake of readability, the pointer to 920 was not repeated and should be construed to refer also to the records and schema gated multi units. Optionally, the respective gated multimodal units 920 are similar to 820 as shown in FIG. 8, however architectures, parameters, meta-parameters and/or the likes may vary between implementations.

The joint gated multimodal unit 940 generates the joint representation of the tabular entity properties $h_T$, and an additional gated multimodal unit 950 combines the joint representation with the query encoding $h_q$, generating the query dependent joint representation $h_{qT}$. Further, a joint logit processor 960 generates the query dependent joint prediction $\hat{y}_{qT}$.

The ranking, or inference may be based on one, some, or all the predictions, and may be weighted in accordance to confidence predictions, which may be generated by the encoders and/or the gated multimodal units. During training, the joint loss 985 may be based on the true label 990 and on one, some, or all the predictions, including separate predictions. Optionally, the joint gated multimodal unit 940, the additional gated multimodal unit 950, and the joint logit processor 960 are similar to 640, 650 and 660 as shown in FIG. 6, however architectures, parameters, meta parameters and/or the likes may vary between implementations. Similarly, the joint loss 985 and the true label 990 may be similar to 785 and 790 respectively, as shown in FIG. 7, however the joint loss 985 may be based on additional predictions and/or omit one or more predictions from 785, and parameters, functions, and/or the like.

Figure 10:
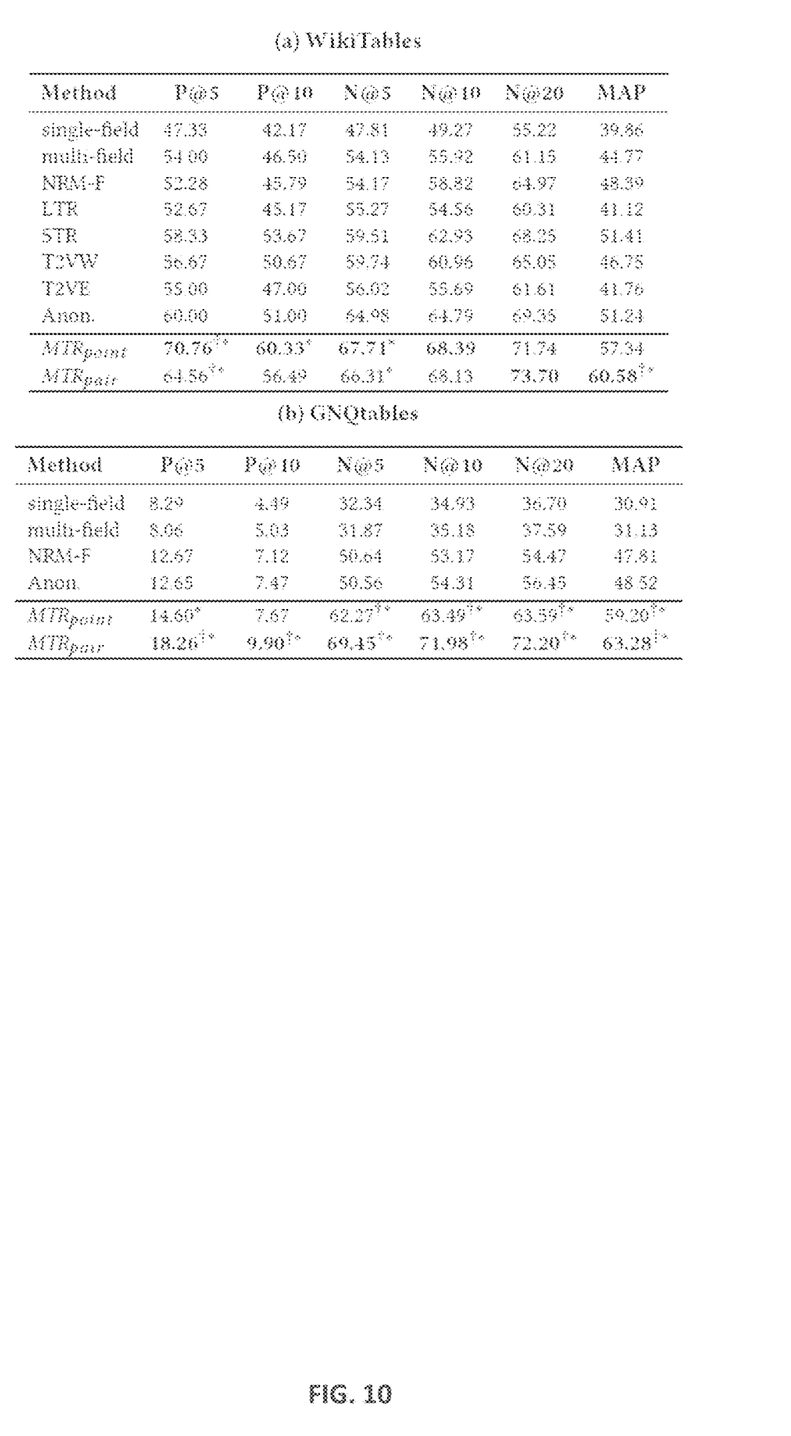
FIG. 10 includes two result comparison tables of an exemplary system for table retrieval using multimodal deep co-learning, with helper query-dependent relevance labels, and prior art, according to some embodiments of the present disclosure.

Attention is now drawn to FIG. 10, which includes two result comparison tables of an exemplary system for table retrieval using multimodal deep co-learning, with helper query-dependent relevance labels, and prior art, according to some embodiments of the present disclosure.

The first table shows experiment results based on the WikiTables dataset. The table shows that prior art representations of tables as either single-field or multi-field documents may not capture many informative properties. Processing tables as multi-field documents, yet processing and interconnecting the various fields within a single model, as done by neural ranking model—(multiple) fields (NRM-F), results in a better performance in most further prior art measures. Enhancing table-retrieval with task engineered features, semantic data, or additional intrinsic and extrinsic table similarities, results in better performance than most further prior art. Among the evaluated baselines, TabIESim has obtained the best performance with respect to most prior art evaluation measures with an exception in precision at ten (P@10) and mean average precision (MAP), where STR performed slightly better. MTR was better than all baselines for all measures, with improvements over the top performing baseline of +8%, +5%, +6% and +18% in terms of precision at five, precision at ten, normalized discounted cumulative gain at 20 (NDCG@20) and mean average precision, respectively. TabIESim is described in the publication "Table Retrieval using Intrinsic and Extrinsic Similarities" by Roee Shraga, Haggai Roitman, Guy Feigenblat and Mostafa Canim, published in The Web Conference (WWW), 2020.

The second table shows experiment results based on the GNQtables dataset. First, as we may observe, among the two most competitive baselines neural ranking model—(multiple) fields (NRM-F) and TabIESim, the latter was only slightly better. Compared to these baselines, MTR had a significantly better performance, e.g., +44%, +28% and +30% better precision at five, normalized discounted cumulative gain at 20, and mean average precision, respectively. This may suggest that, MTR is suited for natural language querying settings.

Figure 11:
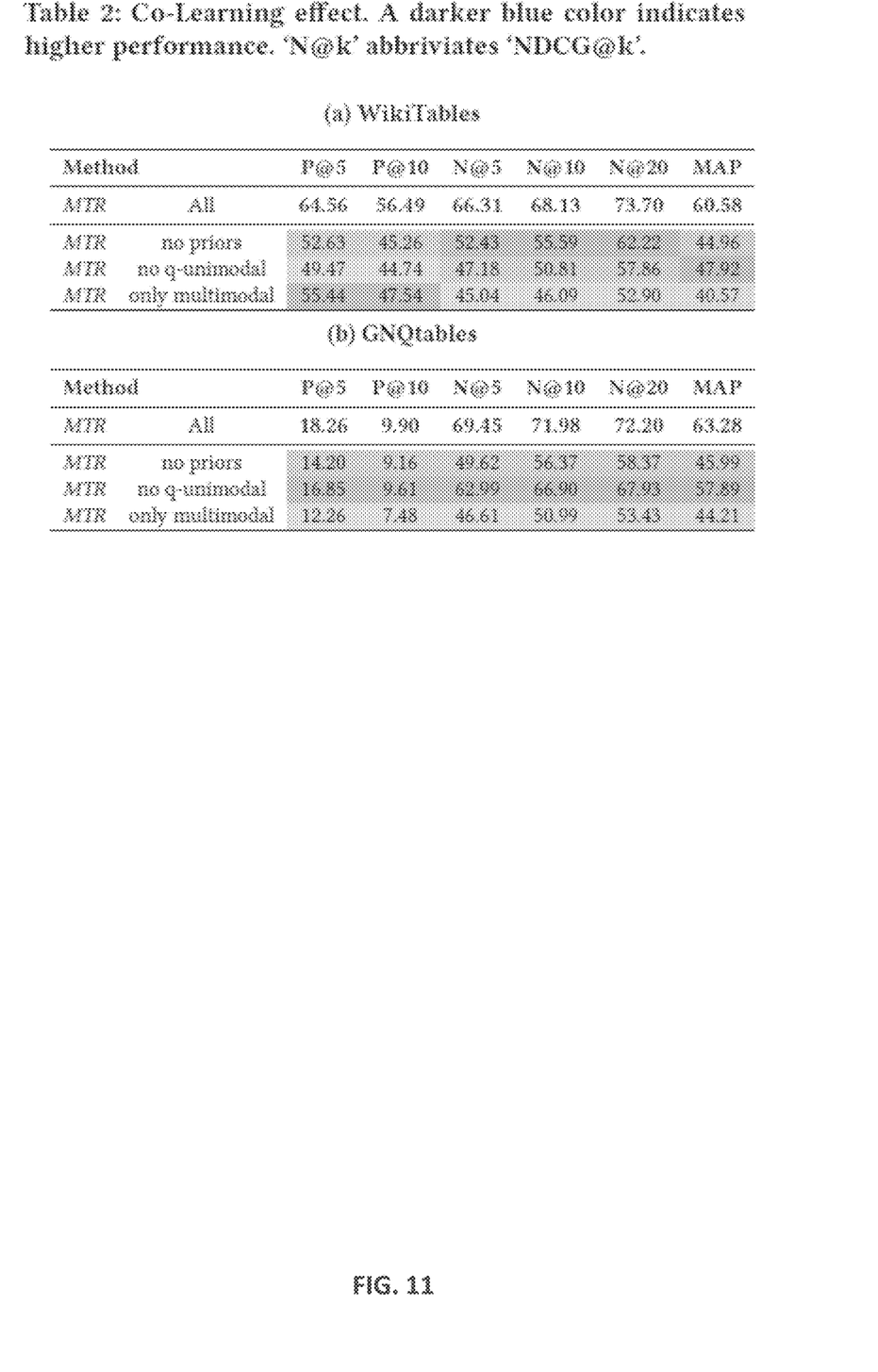
FIG. 11 includes two result comparison tables of an exemplary system for table retrieval using multimodal deep co-learning, with and without helper query-dependent and query-independent relevance labels and priors, according to some embodiments of the present disclosure.

Attention is now drawn to FIG. 11, which includes two result comparison tables of an exemplary system for table retrieval using multimodal deep co-learning, with and without helper query-dependent and query-independent relevance labels and priors, according to some embodiments of the present disclosure.

These tables are included in the disclosure to exemplify the effect of co-learning on re-ranking quality. The descriptions of FIG. 7 to FIG. 9 show that, the main component that is affected in our co-learning approach may be the loss function. Three additional implementations based on MTR were trained, namely "no priors" where separate predictions or prior helpers (i.e., $\hat{y}_q$ and $\hat{y}_m$ wherein m refers to the modality, i.e. description (d), schema (s) records (r) and facets (c)) are omitted from the loss function; "no q-unimodal" where unimodal, or separate query-dependent predictions or helpers (i.e., $\hat{y}_{qm}$) are omitted; and "only multimodal" where learning is applied without any helpers or relevance estimations.

The tables show comparison of these three variants with the original MTR ("All") for WikiTables and GNQtables. The full MTR model performed better compared to its partial versions. For example, compared to the best partial model, the full MTR model has achieved +16% and +23% boost in precision at five and normalized discounted cumulative gain at ten, respectively, on the WikiTables benchmark; and +8% and +8% boost in precision at five and normalized discounted cumulative gain at ten, respectively, on the GNQtables benchmark. Note that, when analyzing the influence of the priors and unimodal segments, lower quality without a given segment may actually indicate more importance, as it means that the model is unable to get along without that segment. Examining WikiTables, we observe that, the measures are differently affected by the segments. However, for GNQtables, results indicate clear pattern, indicating the segments' importance, highlighting the effect of the separate and query dependent separate predictors, or the prior helpers over q-unimodal helpers, or separate predictions (and using the multimodal alone). This may be explained by the informativeness of natural language queries captured in $\hat{y}_q$ and $\hat{y}_{qT}$, making the q-unimodal inputs, or query encoding less important. For WikiTables, the q-unimodal helpers, or separate predictions, are important to precision at five and precision at ten, yet for mean average precision, the model is able to achieve good results without them. Furthermore, the model is able to obtain higher precision at five and precision at ten without any helpers. Yet, similar to GNQtables, for normalized discounted cumulative gain and mean average precision the opposite is true, suggesting that the interaction between the helpers (as expressed in the full model, and specifically the prior helpers such as the separate predictors and query dependent predictors), is important.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods of computational processing, machine learning, deep learning, optimization, encoding, embedding, activations, normalization, regularization and the likes will be developed and the scope of the terms encoder, unit, processor, and logit processor are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

It should be emphasized that the disclosure is not limited to the specific or specific number of properties, and different properties may be processed similarly or differently.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable sub-combination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to embodiments. To the extent that section headings are used, they should not be construed as necessarily limiting.

What is claimed is:

1. A system for ranking tabular data entities by likelihood of comprising answers for natural language queries, the system comprising:
    at least one memory storing a machine learning based model and a code; and
    a processor adapted to execute the code for:
        receiving a query and a plurality of descriptions of tabular entities, each description comprising a plurality of separate representations, and each of the plurality of separate representations represents a tabular data aspect, the separate representations comprising one of a list of words or combinations of words, or an encoded and/or an embedded representation of one or more properties of at least one tabular entity;
        generating a joint representation by combining a plurality of combined representations from the plurality of separate representations, wherein the combining is executed by a gated multimodal unit and the joint representation is based on all of or a selection of the plurality of separate representations; and
        generating a ranking for at least one of the tabular entities descriptions by combining the query and the joint representation.

2. The system of claim 1, wherein the processor is further adapted to combine the query and the joint representation.

3. The system of claim 2, wherein the combining of the query and the joint representation includes using an additional gated multimodal unit.

4. The system of claim 1, wherein the plurality of combined representations comprises three or more separate representations.

5. The system of claim 1, wherein at least one representation from the plurality of separate representations is obtained by embedding, generated by a neural embedding model.

6. The system of claim 1, wherein generating the ranking for the at least one of the tabular entities descriptions is further based on a prediction generated by the at least one of the plurality of separate representations.

7. The system of claim 1, wherein generating the ranking for the at least one of the tabular entities descriptions is further based on combining the at least one of the plurality of separate representations and a representation generated for the query.

8. The system of claim 6, wherein generating the ranking for the at least one of the tabular entities descriptions is further based on a relevance label for the prediction, and wherein the relevance label was trained using at least one other prediction generated based on the plurality of separate representations.

9. The system of claim 1, wherein the processor is further adapted to calculate a joint loss by combining at least two representations of the plurality of separate representations.

10. A computer implemented method for ranking tabular data entities by likelihood of comprising answers for natural language queries, the method comprising:
    receiving a query and a plurality of descriptions of tabular entities, each description comprising a plurality of separate representations, and each of the plurality of separate representations represents a tabular data aspect, the separate representations comprising one of a list of words or combinations of words or an encoded and/or an embedded representation of one or more properties of at least one tabular entity;
    generating a joint representation by combining a plurality of combined representations from the plurality of separate representations, wherein the combining is executed by at least one gated multimodal unit and the joint representation is based on all of or a selection of the plurality of separate representations; and
    generating a ranking for at least one of the tabular entities descriptions by combining the query and the joint representation.

11. A computer implemented method of training a tabular data entities ranking system comprising:
    receiving a query and a plurality of descriptions of tabular entities, each description comprising a plurality of separate representations, and each of the plurality of separate representations represents a tabular data aspect, the separate representations comprising one of a list of words or combinations of words or an encoded and/or an embedded representation of one or more properties of at least one tabular entity;
    generating a joint representation by combining a plurality of combined representations from the plurality of separate representations, wherein the combining is executed by a gated multimodal unit and the joint representation is based on all of or a selection of the plurality of separate representations;
    generating a ranking for at least one of the tabular entities descriptions by combining the query and the joint representation;
    combining at least two representations from the plurality of separate representations for calculating a joint loss; and
    training at least one part of the tabular data entities ranking system using a loss function comprising the joint loss.

12. The method of claim 11, further comprising using an additional gated multimodal unit to combine the query and the joint representation.

13. The method of claim 11, wherein at least one representation of the plurality of separate representations is obtained by embedding, generated by a neural embedding model.

14. The method of claim 13, wherein the neural embedding model comprises a multi-dimensional convolutional neural network.

15. The method of claim 11, wherein the calculating of a joint loss further comprises processing a representation generated for the query and one of the plurality of separate representations using a further additional gated multimodal unit.

16. The method of claim 11, wherein the combining at least two representations is obtained by using an additional gated multimodal unit.

17. The method of claim 11, wherein the calculating of a joint loss further comprises an aspect loss generated for at least one of the plurality of separate representations, and wherein the aspect loss is based on a prediction generated by the at least one of the plurality of separate representations.

18. The method of claim 11, wherein a separate prediction is generated based on at least one separate representations from the plurality of separate representations, and wherein the separate prediction is trained to predict the tabular data entities ranking.

19. The method of claim 11, wherein a separate prediction is generated based on at least one separate representations from the plurality of separate representations and a representation generated for the query, and wherein the separate prediction is trained to predict the tabular data entities ranking.

20. The method of claim 19, further comprising predicting a relevance label for the separate prediction, wherein the predicting a relevance label is trained using at least one other prediction generated based on the plurality of separate representations.

* * * * *